(12) United States Patent  (10) Patent No.: US 7,573,550 B2
Lubart et al.  (45) Date of Patent: Aug. 11, 2009

(54) DEVICES FOR USE IN NON-EMISSIVE DISPLAYS

(75) Inventors: Neil D. Lubart, Austin, TX (US); Timothy J. Wojciechowski, Westlake, OH (US); Andrew P. Laurence, Mantus, OH (US)

(73) Assignee: Brilliant Film, LLC, Cleveland, OH (US)

( * ) Notice: Subject to any disclaimer, the term of this patent is extended or adjusted under 35 U.S.C. 154(b) by 589 days.

(21) Appl. No.: 10/849,984

(22) Filed: May 20, 2004

(65) Prior Publication Data

US 2005/0018103 A1  Jan. 27, 2005

Related U.S. Application Data

(60) Provisional application No. 60/472,031, filed on May 20, 2003, provisional application No. 60/488,963, filed on Jul. 21, 2003.

(51) Int. Cl.
*G02F 1/1335* (2006.01)
(52) U.S. Cl. .......................... 349/113; 349/114; 349/61
(58) Field of Classification Search ................... 349/64, 349/62, 118
See application file for complete search history.

(56) References Cited

U.S. PATENT DOCUMENTS

| 1,253,138 | A | 1/1918 | Brewster |
|---|---|---|---|
| 3,809,686 | A | 5/1974 | Chandross et al. |
| 3,936,157 | A | 2/1976 | Kapany |
| 3,985,116 | A | 10/1976 | Kapany |
| 3,993,485 | A | 11/1976 | Chandross et al. |
| 4,040,727 | A | 8/1977 | Ketchpel |
| 4,093,356 | A | 6/1978 | Bigelow |
| 4,196,973 | A | 4/1980 | Hochstrate |
| 4,268,127 | A | 5/1981 | Oshima et al. |
| 4,315,258 | A | 2/1982 | McKnight et al. |
| 4,398,805 | A | 8/1983 | Cole |
| 4,436,377 | A | 3/1984 | Miller |
| 4,459,182 | A | 7/1984 | te Velde |
| 4,541,692 | A | 9/1985 | Collins et al. |

(Continued)

FOREIGN PATENT DOCUMENTS

JP  05249450 A  *  9/1993

(Continued)

OTHER PUBLICATIONS

Enclosed is a machine translation of Sumiyoshi (JP 05-249450).*

*Primary Examiner*—David Nelms
*Assistant Examiner*—Lucy P Chien
(74) *Attorney, Agent, or Firm*—Pepper Hamilton LLP

(57) ABSTRACT

A liquid crystal module comprising a liquid crystal layer containing a plurality of pixels therein, a waveguide layer, and a reflective layer provided between the liquid crystal layer and the waveguide layer, the reflective layer includes a plurality of reflective areas and a plurality of apertures to permit light to pass therethrough. The waveguide layer can include a transparent material having first and second surfaces and a plurality of spaced-apart waveguide structures defining apertures therebetween disposed within the transparent material. The waveguide structures can be configured to guide light, entering the first surface of the transparent material, through the film and permit such light to exit the second surface of the transparent material.

15 Claims, 12 Drawing Sheets

U.S. PATENT DOCUMENTS

| | | | |
|---|---|---|---|
| 4,545,648 A | 10/1985 | Shulman et al. | |
| 4,621,898 A | 11/1986 | Cohen | |
| 4,636,786 A | 1/1987 | Haertling | |
| 4,637,687 A | 1/1987 | Haim et al. | |
| 4,712,854 A | 12/1987 | Mikami et al. | |
| 4,748,546 A | 5/1988 | Ukrainsky | |
| 4,754,275 A | 6/1988 | Abbaticchio et al. | |
| 4,799,137 A | 1/1989 | Aho | |
| 4,813,765 A | 3/1989 | Negishi | |
| 4,832,459 A | 5/1989 | Harper et al. | |
| 4,863,224 A | 9/1989 | Afian et al. | |
| 4,936,659 A | 6/1990 | Anderson et al. | |
| 5,028,105 A | 7/1991 | Drexhage et al. | |
| 5,048,931 A | 9/1991 | Magocs | |
| 5,049,481 A | 9/1991 | Okamoto et al. | |
| 5,054,872 A | 10/1991 | Fan et al. | |
| 5,067,404 A | 11/1991 | Frunder et al. | |
| 5,130,827 A | 7/1992 | Pavone et al. | |
| 5,136,677 A | 8/1992 | Drexhage et al. | |
| 5,146,355 A | 9/1992 | Prince et al. | |
| 5,226,105 A | 7/1993 | Myers | |
| 5,291,184 A | 3/1994 | Iino | |
| 5,309,544 A | 5/1994 | Saxe | |
| 5,339,179 A | 8/1994 | Rudisill et al. | |
| 5,396,350 A * | 3/1995 | Beeson et al. | 349/62 |
| 5,428,468 A | 6/1995 | Zimmerman et al. | |
| 5,467,208 A | 11/1995 | Kokawa et al. | |
| 5,479,275 A | 12/1995 | Abileah | |
| 5,481,445 A | 1/1996 | Sitzema et al. | |
| 5,541,039 A | 7/1996 | McFarland et al. | |
| 5,541,247 A | 7/1996 | Koike | |
| 5,550,657 A | 8/1996 | Tanaka et al. | |
| 5,557,295 A | 9/1996 | Miyashita et al. | |
| 5,573,889 A | 11/1996 | Hofmann et al. | |
| 5,594,830 A | 1/1997 | Winston et al. | |
| 5,596,143 A | 1/1997 | Hashimoto | |
| 5,598,281 A * | 1/1997 | Zimmerman et al. | 349/5 |
| 5,626,800 A | 5/1997 | Williams et al. | |
| 5,645,973 A | 7/1997 | Hofmann et al. | |
| 5,647,040 A | 7/1997 | Modavis et al. | |
| 5,655,827 A | 8/1997 | Kaneko et al. | |
| 5,661,839 A | 8/1997 | Whitehead | |
| 5,668,614 A | 9/1997 | Chien et al. | |
| 5,684,551 A | 11/1997 | Nakamura et al. | |
| 5,686,979 A | 11/1997 | Weber et al. | |
| 5,706,065 A | 1/1998 | Yano | |
| 5,739,931 A | 4/1998 | Zimmerman et al. | |
| 5,751,871 A | 5/1998 | Krivoshlykov et al. | |
| 5,754,262 A | 5/1998 | Lengyel | |
| 5,761,354 A | 6/1998 | Kuwano et al. | |
| 5,761,355 A | 6/1998 | Kuper et al. | |
| 5,761,364 A | 6/1998 | Knapp et al. | |
| 5,781,342 A | 7/1998 | Hannon et al. | |
| 5,783,340 A | 7/1998 | Farino et al. | |
| 5,807,906 A | 9/1998 | Bonvallot et al. | |
| 5,838,403 A | 11/1998 | Jannson et al. | |
| 5,870,176 A | 2/1999 | Sweatt et al. | |
| 5,881,201 A | 3/1999 | Khanarian | |
| 5,889,570 A | 3/1999 | Mitsui et al. | |
| 5,920,367 A | 7/1999 | Kajimoto | |
| 5,926,203 A | 7/1999 | Shimura et al. | |
| 5,926,601 A | 7/1999 | Tai et al. | |
| 5,929,956 A | 7/1999 | Neijzen et al. | |
| 5,949,506 A | 9/1999 | Jones et al. | |
| 5,956,107 A | 9/1999 | Hashimoto et al. | |
| 5,963,284 A | 10/1999 | Jones et al. | |
| 5,963,687 A | 10/1999 | Schneider | |
| 5,985,084 A | 11/1999 | Summersgill et al. | |
| 5,986,730 A | 11/1999 | Hansen et al. | |
| 5,989,776 A | 11/1999 | Felter et al. | |
| 5,998,096 A | 12/1999 | Umemoto et al. | |
| 6,002,829 A | 12/1999 | Winston et al. | |
| 6,007,963 A | 12/1999 | Felter et al. | |
| 6,008,871 A | 12/1999 | Okumura | |
| 6,010,747 A | 1/2000 | Beeson et al. | |
| 6,011,601 A | 1/2000 | Kojima | |
| 6,025,897 A | 2/2000 | Weber et al. | |
| 6,027,222 A | 2/2000 | Oki et al. | |
| 6,030,540 A | 2/2000 | Yamamoto et al. | |
| 6,044,196 A | 3/2000 | Winston et al. | |
| 6,078,421 A | 6/2000 | Davey et al. | |
| 6,080,477 A | 6/2000 | Narasimhan | |
| 6,097,871 A | 8/2000 | De Dobbelaere et al. | |
| 6,195,140 B1 * | 2/2001 | Kubo et al. | 349/44 |
| 6,473,220 B1 * | 10/2002 | Clikeman et al. | 359/247 |
| 6,600,535 B1 | 7/2003 | Tsuda et al. | |
| 6,707,518 B1 | 3/2004 | Cowan | |
| 6,819,465 B2 | 11/2004 | Clikeman et al. | |
| 6,919,981 B2 | 7/2005 | Clikeman et al. | |
| 2002/0180909 A1 | 12/2002 | Lubart et al. | |
| 2004/0233354 A1 * | 11/2004 | Uehara et al. | 349/113 |
| 2005/0018103 A1 | 1/2005 | Lubart et al. | |
| 2005/0140846 A1 | 6/2005 | Lubart et al. | |
| 2005/0185416 A1 | 8/2005 | Lee et al. | |
| 2005/0259198 A1 | 11/2005 | Lubart et al. | |

FOREIGN PATENT DOCUMENTS

| | | |
|---|---|---|
| WO | WO 96/35971 | 11/1996 |
| WO | WO 98/21626 | 5/1998 |

* cited by examiner

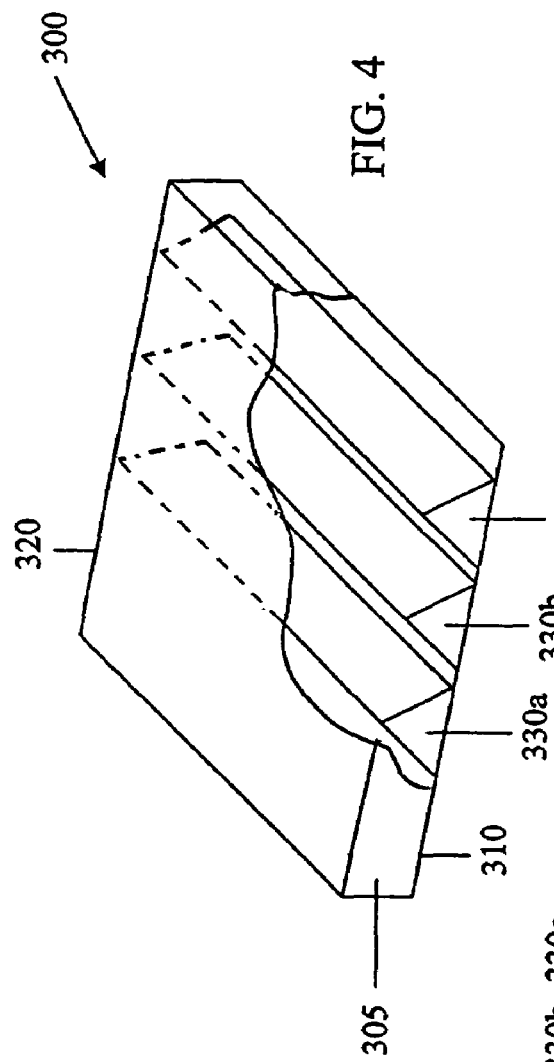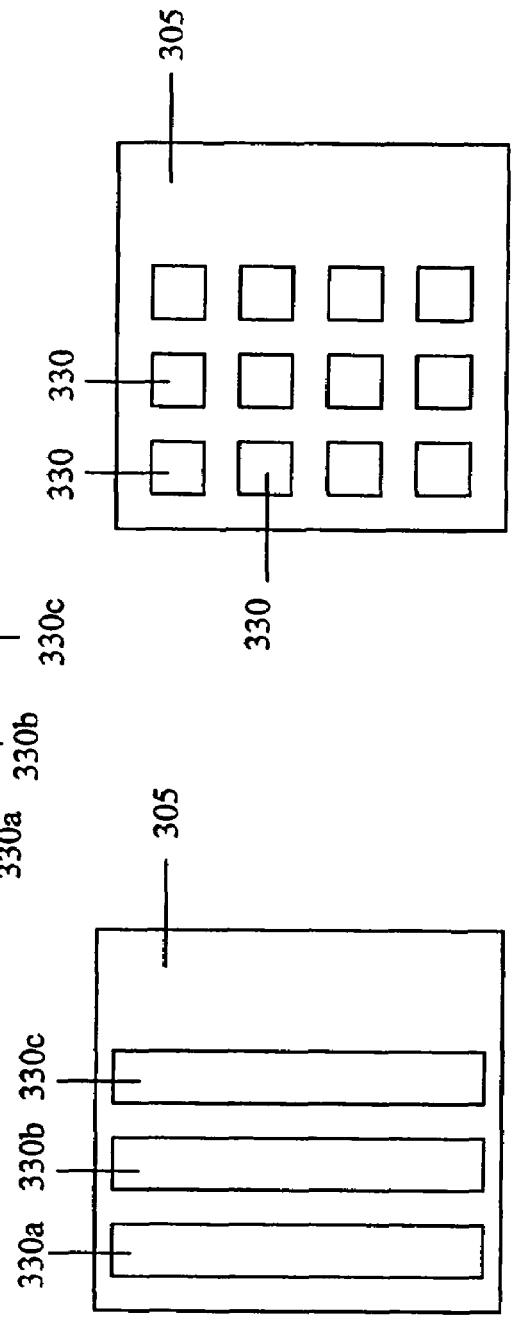

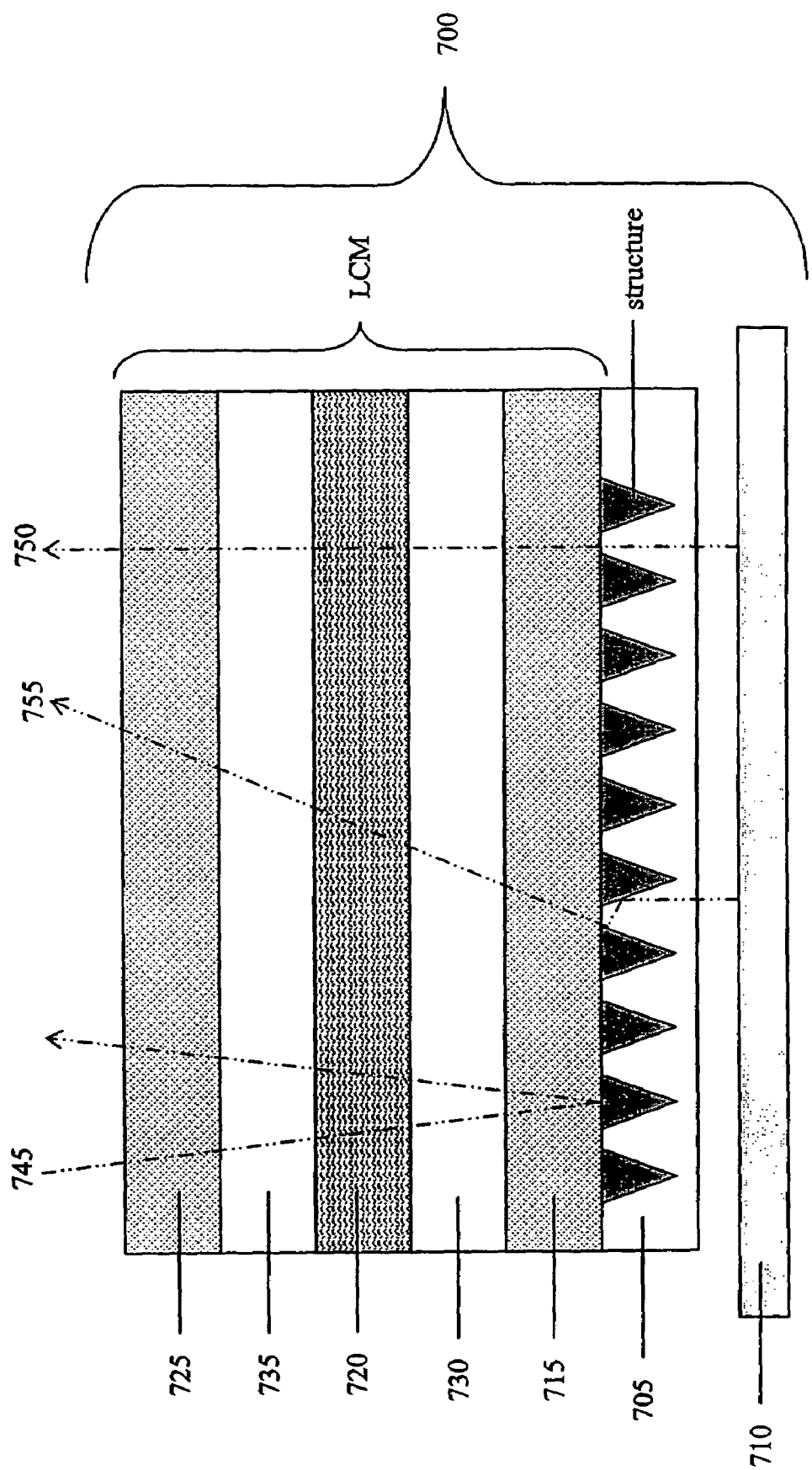

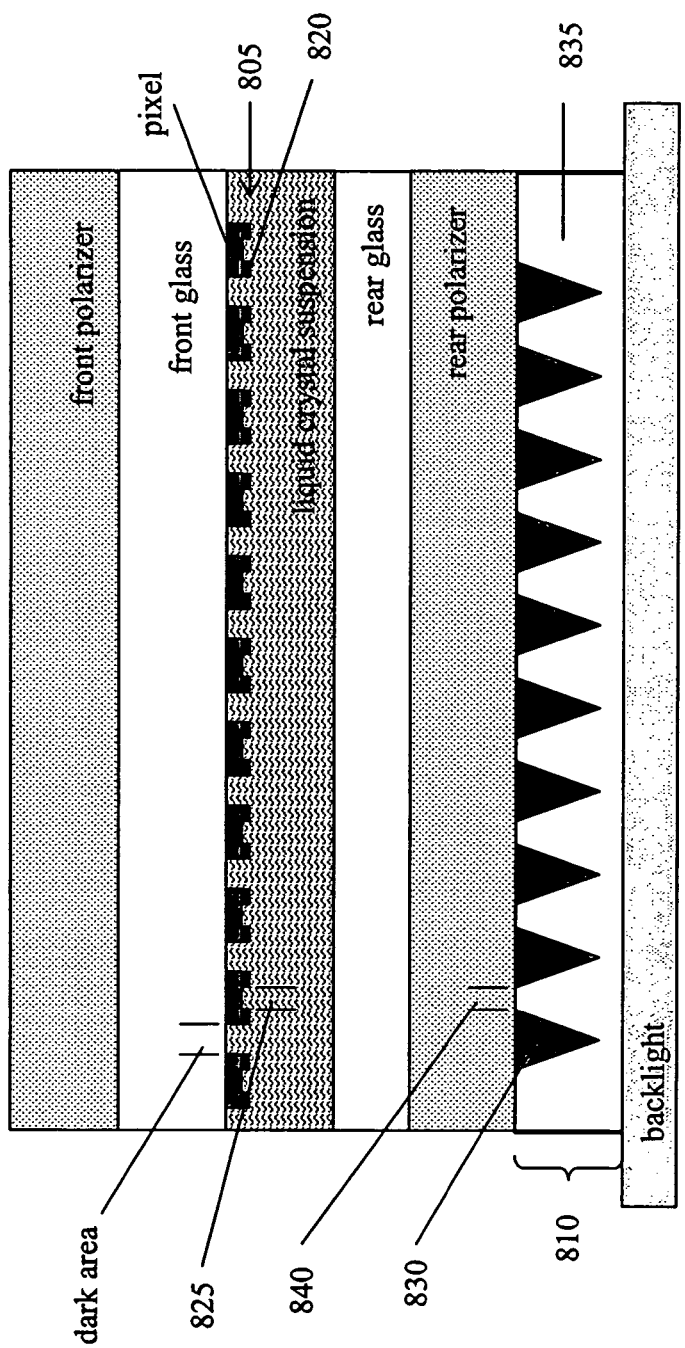

DEVICES FOR USE IN NON-EMISSIVE DISPLAYS

CROSS-REFERENCE TO RELATED APPLICATIONS

This application claims the benefit of priority of U.S. Provisional Application No. 60/472,031 filed on May 20, 2003, and U.S. Provisional Application No. 60/488,963 filed on Jul. 21, 2003, which are both hereby incorporated by reference in their entireties herein.

BACKGROUND

Non-emissive displays, particularly liquid crystal displays, include either reflective displays or surface light source displays (i.e., transmissive displays), commonly denoted backlit displays. Illustrated in FIG. 1 is a conventional reflective display 100. The conventional reflective display 100 includes a liquid crystal suspension 110 sandwiched between glass plates 120, which are sandwiched between polarizers 130. The glass plates 120 can include color filters, common electrodes, TFT matrix, or other components. The conventional reflective display 100 further includes a reflective layer 140 positioned at the bottom of the stack to redirect light back through the other display elements. In operation, light 150 from an ambient source (e.g., sunlight, artificial light (office lighting)) or light 150 from a light source 160 attached to the top of the stack enters the reflective display 100, passes through the polarizers 130, the glass plates 120, and the liquid crystal suspension 140, and is redirected from the reflective film 150 back through the same layers to produce an image. This display 100 creates an image with available ambient light is limited by the available light. This display 100 is not very effective in producing high quality graphic images and severely limits the quality of color images in a variety of conditions.

Illustrated in FIG. 2 is a conventional backlit display 200. The conventional backlit display 200 includes a liquid crystal suspension 210 sandwiched between glass plates 220, which are sandwiched between polarizers 230. The glass plates 220 can include color filters, common electrodes, TFT matrix, or other components. The conventional backlit display 200 further includes a backlight 240 positioned at the bottom of the stack to produce light 250 and direct it through the layers in the stack. Since this device 200 produces an image with artificial light, it is somewhat limited by the amount of ambient light and, in displays where a battery is used some or all of the time to generate power, the battery life. When ambient light is present, glare is created by light reflecting off the various layers, as described above, without passing through all the layers in the stack. To overcome this glare and to produce an image that is palatable to a user, the backlight gain should be increased to produce more usable light, i.e. more light passing through the layers in the stack. This increase in artificial light can cause an added drain on the battery and, thus, reduces the usability of the system to which the display is attached. As ambient light increases, glare increases and, thus, at some point, the backlight becomes ineffective in producing a palatable image.

Previous attempts to use simultaneously the ambient light and a backlight have resulted in applications that compromise both the transmissive qualities and the reflective qualities of the display. Hochstrate, in U.S. Pat. No. 4,196,973 discloses the use of a transflector for this purpose. Weber, in U.S. Pat. No. 5,686,979, discloses the limitations of the transflector for this purpose and alternatively proposes a switchable window that at one time is wholly transmissive and at another time is wholly reflective.

BRIEF DESCRIPTION OF THE DRAWINGS

It will be appreciated that the illustrated boundaries of elements (e.g., boxes or groups of boxes) in the figures represent one example of the boundaries. One of ordinary skill in the art will appreciate that one element may be designed as multiple elements or that multiple elements may be designed as one element. An element shown as an internal component of another element may be implemented as an external component and vice versa.

Further, in the accompanying drawings and description that follow, like parts are indicated throughout the drawings and description with the same reference numerals, respectively. The figures are not drawn to scale and the proportions of certain parts have been exaggerated for convenience of illustration.

FIG. 4 illustrates a perspective view of one embodiment of the device 300;

FIG. 5A illustrates a bottom view of FIG. 4;

FIG. 5B illustrates another embodiment of a bottom view of FIG. 4;

FIG. 7 illustrates a cross-sectional view of one embodiment of an LCD display stack 700 utilizing a device 705 having reflective and transmissive properties;

FIG. 8 illustrates a cross-sectional view of one embodiment of an LCD display stack 800 including a reflective layer 805 that is separated from a wave-guide layer 810;

FIG. 8A illustrates a cross-sectional view of one embodiment of an LCD display stack 800 including a reflective layer 805 that is separated from a waveguide layer 810;

DETAILED DESCRIPTION

As used herein, the term "light" encompasses electromagnetic radiation with wavelengths corresponding to visible through infrared or other wavelengths of electromagnetic radiation that are capable of being reflected or refracted. Exemplary forms of electromagnetic radiation include, but are not limited to, radio, radar, microwave, infrared, visible, ultraviolet, x-ray and gamma forms of radiation.

$R_1$=reflectivity from one side
$T_1$=transmissivity from one side
$A_1$=absorptivity from one side
$R_2$=reflectivity from the other side
$T_2$=transmissivity from the other side
$A_2$=absorptive from the other side From the conservation of energy: $R_1+T_1+A_1=1$ and $R_2+T_2+A_2=1$ In prior art of transflectors, $R=R_1=R_2$; $T=T_1=T_2$; and $A=A_1=A_2$. It follows that in the prior designs, $R+T=1$ when $A=0$. Even where prior art claims to overcome the limit of transflectors and where the disclosed transflector is meant to channel or direct light, no overall transmittance or reflectance is shown so that any possible gain cannot be determined and is not apparent.

In this art, the value of the reflectance on one side of the film is significantly decoupled from the value of the reflectance on the other side, and the value of the transmissivity on one side is significantly decoupled from the value of the transmissivity on the other side. This newly disclosed film allows $R_1 \neq R_2$, $T_1 \neq T_2$, and $A_1 \neq A_2$. A specific embodiment will be shown below in which $T_1$, $R_2$, $A_1$, and $A_2$ are small. It follows that $R_1+T_2>1$. This disclosed film multiplies the transflecting effect. In the theoretical limit, for this non-emissive version of the film, $T_1=R_2=A_1=A_2=0$. Then $R_1+T_2=2$.

As used herein, a device having reflective and transmissive properties is capable of transmitting and reflecting light. The sum of the percent of light capable of being reflected, plus the sum of light capable of being transmitted, will be greater than 100 percent.

Figure 1:
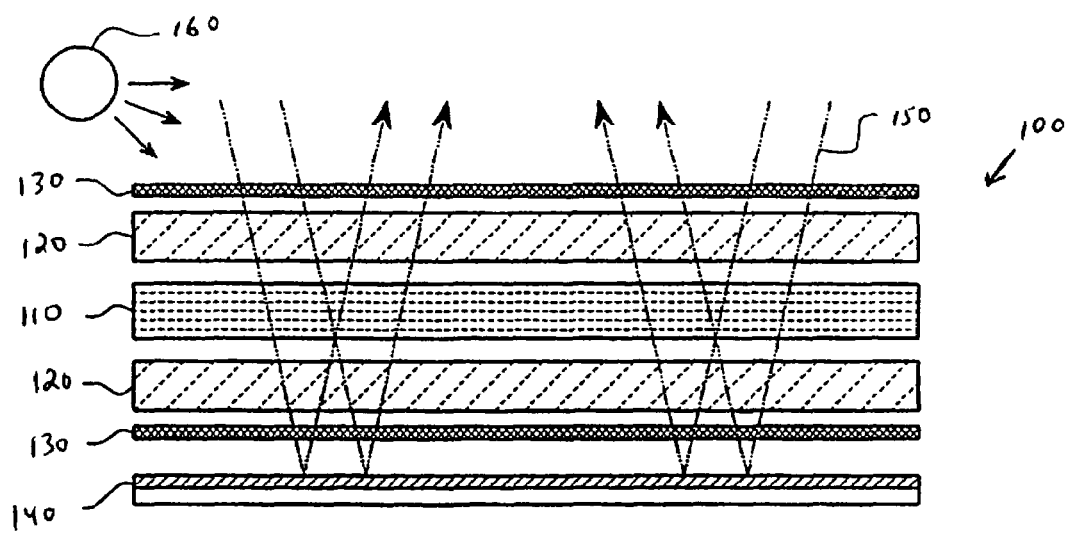
FIG. 1 (prior art) is a diagram showing the operation of a conventional reflective display.
Figure 2:
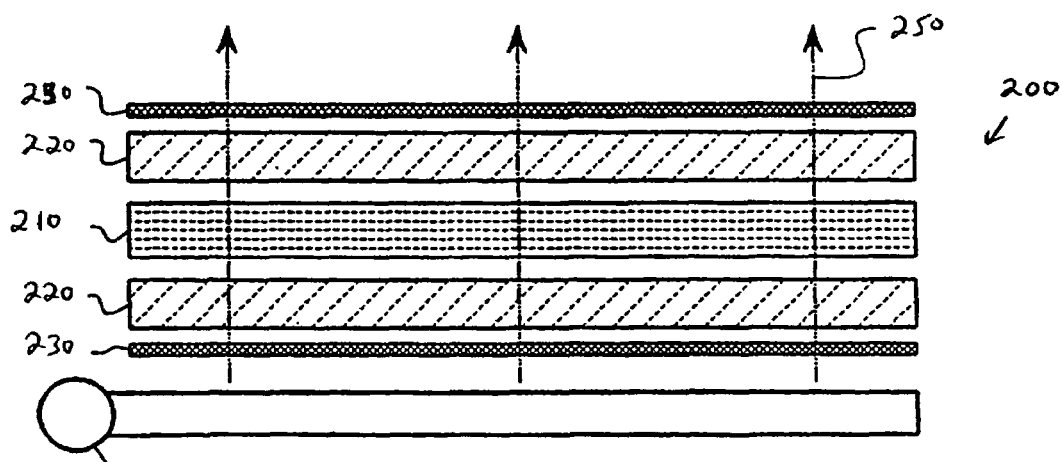
FIG. 2 (prior art) is a diagram showing the operation of a conventional backlight display.
Figure 3:
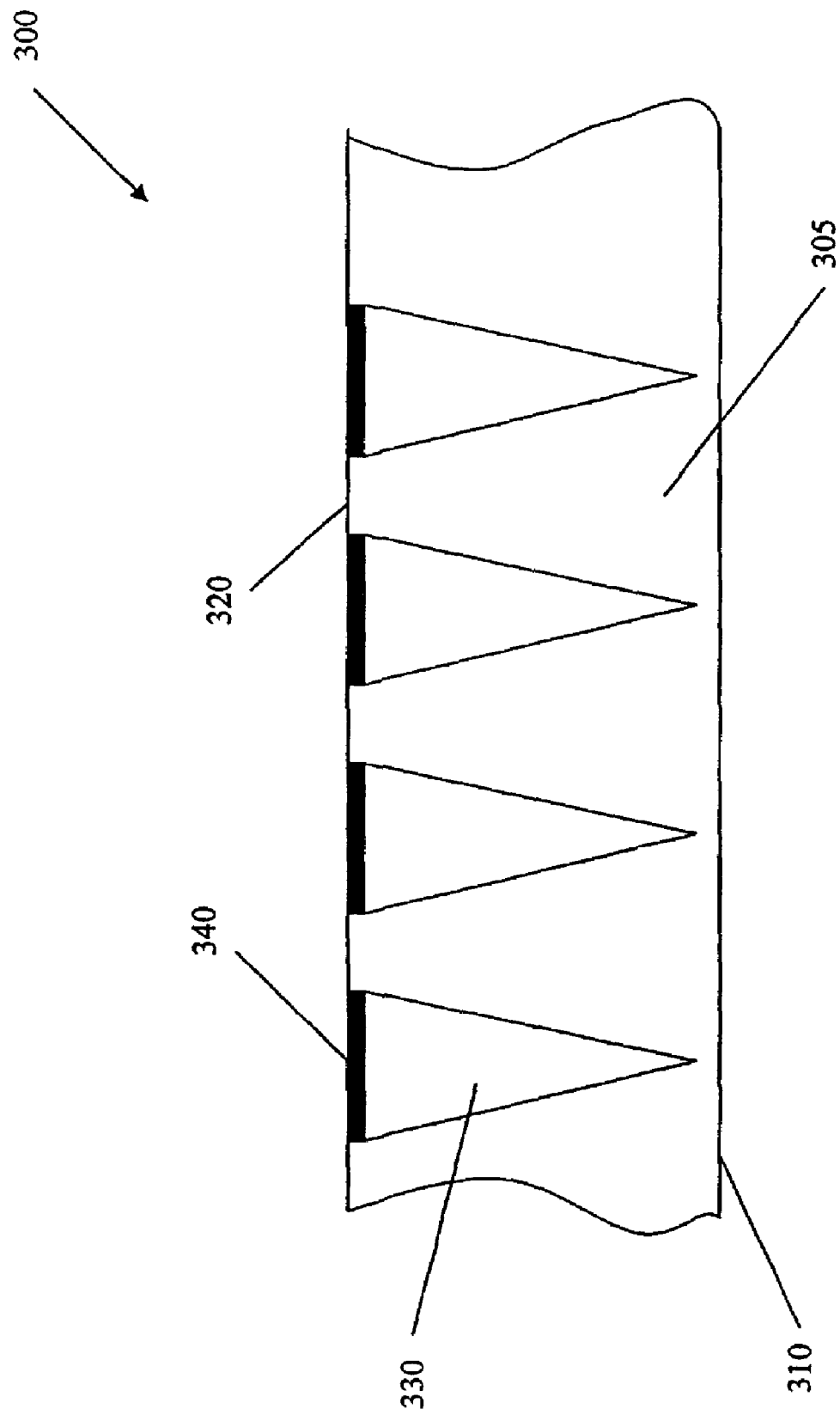
FIG. 3 illustrates a cross-sectional view of one embodiment of a device 300 having reflective and transmissive properties.

FIG. 3 illustrates a cross-sectional view of one embodiment of a device 300 having reflective and transmissive properties. In one embodiment, the device 300 includes a transparent material or substrate 305 having a first surface 310 and an opposing, second surface 320. The device 300 can also include a plurality of spaced-apart reflective structures 330 positioned within the transparent substrate 305 defining apertures therebetween. One example of a device having reflective and transmissive properties is described and illustrated in U.S. Pat. No. 6,473,220 owned by Trivium Technologies, Inc., which is hereby incorporated by reference in its entirety herein.

As used herein, the terms "reflective or reflection" as used herein, when discussing light striking the body of the structure, also include "refractive or refraction" where the difference in the index of refraction of the materials, along with the angle of incidence, results in substantial or near total reflection of the light striking the structure. As used herein, the term "structure" refers to the shape of the element refracting or reflecting light. The structure may be a physically separate item mounted on or in the transparent material, it may be formed or represent a groove or indentation in the transparent material, or it may be the end result of treatment of portions of the transparent material such that a shape having a different index of refraction is formed. Where the transparent material is a gas or vacuum, the structure can be mounted "in" the material by means of a grid, wire, filament or other such device, with the grid representing a surface of the device.

Illustrated in FIG. 4 is a partial cutout perspective view of one embodiment of a device 300, which has a light receiving side 310 (or light transmissive side) and a light reflecting underside 320. This embodiment illustrates three reflective or waveguide structures 330*a*, 330*b*, 330*c* that are positioned side by side, but spaced apart a selected dimension as described above. A view from the under side 320 is shown in FIG. 5A. In this embodiment, the reflective structures 330*a-c* have a shape that decrease in size towards the transmissive side 310 and increase in size towards the reflective underside 320. Although a triangular shape is shown, any shape may be used which is generally smaller at the light transmissive side 310 than at the light reflective side 320. It will be appreciated that the sidewalls of the reflective structure 330*a-c* may or may not be smooth based on a desired effect and manufacturing tolerances. Each structure 330*a-c* has an elongated body that can extend the length of the device 300 or a portion thereof. For example, FIG. 5B shows an embodiment where the reflective structures 330 are formed or deposited within the transmissive substrate 305 as smaller units uniformly distributed and oriented in the device 300. Each structure 330 is shown having a square base adjacent the reflective side 320, however, any desired shape may be used as the base and the structures 330 may be oriented in any desired pattern including a random pattern.

In one embodiment, the cross-section of the reflective structures 330 is triangular shaped each having a base 340 and a pair of sidewalls 350. Each sidewall 350 is at an angle relative to the base 340. In one embodiment, the base 340 is associated with a reflective layer. The angle may be between about 83 degrees and less than 90 degrees. If collimating film is used in conjunction with the device 300, then the angle may be between about 76 degrees and less than 90 degrees. In one embodiment, the width of the base 340 may be between about 2 microns (μ) and about 200 μ. The base 340 of each structure 330 may be separated by a distance between about 1 μ and about 100 μ. In one embodiment, the structures 330 may have a aspect ratio (i.e., the ratio of the height to the base) of between about 2 and about 22.

The performance of the device 300 can be varied by adjusting various factors such as the aspect ratio (i.e., the ratio of the height to the base) of the reflective structures 330, the spacing between the reflective structures 330, and the materials used to construct the device. These factors can determine: (1) the allowable incident angle of the energy entering the device from one direction (transmissive), (2) the proportion of energy transmitted from that direction, (3) the proportion of energy reflected by the opposite side of the device, (4) the distribution of energy emerging from the element, and (5) the percentage of energy lost to internal absorption or scattering. The aspect ratio of the reflective structures 330 can determine the relationship between the specific angle at which the transmitted light enters the device and the angle at which the transmitted light emerges from the device. The spacing between the reflective structures 330 can determine the proportion of light reflected by the device (from the reflective side) and the distribution of transmitted light (from the transmissive side). By increasing the spacing between the reflective structures 330, a smaller proportion of light is redirected from the transmissive side while reflection of light from the opposite direction is reduced. Conversely, by decreasing the spacing between the reflective structures 330, a greater proportion of the transmitted light will be redirected while a larger proportion of the light from the opposite direction will be reflected.

The cross-section of the reflective structures 330 may assume the shape of any polygon that may be arranged in a variety of patterns. In one embodiment, the cross-section of the reflective structures 330 is a triangle where the base of the triangle is situated adjacent to the second surface 320 and the apex (i.e., tip) of the triangle is situated adjacent to the first surface 310 of the transparent substrate 305. It will be appreciated that the structures 330 may be replaced by a series of discrete objects such as pyramids, cones, or any polyhedron, and likewise may be arranged in a variety of patterns or randomly.

The reflecting structures 330 may be repeated in parallel and spaced across the area of the transparent substrate 305. For example, the reflective structures 330 can be arranged in triangular cross-sectional rows within the transparent substrate 305. The reflective structures 330 (and any other reflecting structure described herein) may be arranged in varying shapes, heights, angles, or spaces before a pattern is repeated. Furthermore, the aspect ratio and shape of the structures or discrete objects may vary periodically. By periodic, it is meant that structures eventually repeat. For example, in the case where there are three structures, first consider structure one and structure two. The structures may have different aspect ratios or shapes and be different distances from the surface of the device. In addition, the distance between structures one and two may not be the same as between structures two and three. However, structures four, five and six repeat the distribution of structures one, two and three. Eventually, the structures repeat and there can be long-range order or periodicity. Varying the size, shape, and distance between structures may be used to eliminate diffraction patterns due to its ability to disrupt short-range periodicity. Varying the size, shape, and distance between structures may also eliminate diffraction patterns from causing distortions in larger displays greater than five inches in diagonal.

In one embodiment, the cross-section of a single reflecting structure 330 is triangular and forms a row that can be oriented in the transparent substrate 305 such that the base 340 of the triangle is parallel to and coincident with the plane of one surface of the transparent substrate 305 of the device 300. However, it will be appreciated that the base of the reflecting structure (e.g., triangular cross-section) may be recessed from the plane of the surface of the transparent substrate of the device such that the reflecting structure is embedded within the transparent substrate. In this case, the embedded reflecting structure may be constructed in the following ways: i) a solid reflective structure made of metal or another reflective material; ii) a polymer structure (having a lower index of refraction than the transparent film material) coated with a reflective material at the base of the structure; and iii) a solid polymer structure (having a lower index of refraction than the transparent film material) and a reflective layer separated from the solid polymer structure yet still embedded within the transparent film material.

The discrete faces (e.g., the base 340 and side walls 350) of the reflecting structure 330 (and any other reflecting structure described herein) may be planar, concave, convex, stepped, or pitted such that light reflecting from any face may be controlled. In other embodiments, one or more of the discrete faces of the row of reflecting structures, or discrete shapes, may be planar, concave, convex, stepped, and/or pitted. Additionally, micro-structures (e.g., pyramids or cones) may be deposited on the flattened base of each reflecting structure to further control the direction of reflected energy and to focus the diffused ambient energy in a forward direction, increasing the effective reflectivity. Also, a non-flat surface on the base of the reflecting structure (e.g., concave dimples) can reduce specular reflections. In one embodiment, the height of the dimples is between about 0.1 micron ($\mu$) and 1 $\mu$. Additionally, the base of a triangular cross-sectional reflecting structure may have different features than the other faces (i.e., the side walls) of that very same reflecting structure. These features may include planar, concave, convex, pitted, or dimpled surfaces. Furthermore, the discrete faces of each reflecting structure may converge to form either a sharp point or a radius of curvature. A radius of curvature applied on the structure's reflective coating will eliminate sharp edges. Such edges may create unwanted diffraction effects in this application. A radius applied to the edges of the exterior reflective surface adjacent to the window opening can be used to minimize or eliminate such diffraction effects. The foregoing discussion pertaining to reflective or waveguide structures applies to all reflective or waveguide structures described herein.

The transparent material or substrate 305 can include any light transmissive polymer, glass, or other composite material. The transparent substrate 305 should be highly optically transmissive to visible, ultraviolet, and/or near infrared light between about 300-2,500 nanometers, stable to ultraviolet light, impervious to moisture, non-hygroscopic, scratch resistant, and easy to keep clean, with an appropriately chosen refractive index to match the other elements of the system in which it is a part. In one embodiment, the transparent substrate 305 can have specific properties that minimize absorption and redirection of energy—such as internal scattering. If an adhesive is used to secure the device in an application, the adhesive should be highly optically transmissive to light between about 300-2,500 nanometers and stable to ultraviolet light. The foregoing applies to all transparent materials or substrates discussed herein.

By using basic geometry and a rudimentary understanding of geometric optics, one skilled in the art can calculate what aspect ratio and width between structures is necessary to preferably redirect light striking near the tip no more than twice before exiting. For example, a light ray striking a triangular row of structures near the tip will have the most number of redirections before possibly exiting the element. A geometric plot of the light ray path can be used to derive the relationships between the various parameters, including the constraints of the system. The height of the structure will be determined by several factors, among which is the thickness of the transparent material. If the requirement of a specific application is to transmit light through the transflector within 10 degrees of perpendicular, then assuming a height, one can plot or calculate the apex angle. The apex angle and the height will give the aspect ratio and thus the width of the base of the structure.

The general relationship between the aspect ratio of height to base for the reflecting structures and the spacing between structures is illustrated in the following examples:

EXAMPLE 1

A single structure is triangular in cross section and extends along the full length of the device from one side to the other. The above structure is repeated at regular intervals such that one side of the entire body of the device is covered with the bases of alternating triangular rows and spaces in-between. If the specific application requirement for the device calls for approximately 66.6% of the energy from one side (the reflecting side) is to be reflected and the transmitted energy from the opposite side is restricted to emerge about 5°, than the aspect ratio must be a minimum of 11.5:1. The spacing between the structures in this example will be approximately half the dimension of the base of a structure. In this example, the sum of potentially useful reflected energy from one side R plus the sum of potentially useful transmitted energy from the opposite side T is approximately 1.66 (R+T=1.66). This can be restated as 66.6% of the energy entering the device from the reflective side is reflected and 100% of energy entering the element from the transmissive side is transmitted (R=66.6% and T=100% so that R+T=166%).

EXAMPLE 2

Assume that the structures are the same as in example 1 and that the specific application requirements call for maximizing the amount of transmitted energy independent of any specific angle of emergence. Also assume that the energy entering the element from the transmissive side is uniformly collimated within about 10° of perpendicular to the plane of the device. In this example, the requirements are for reflection of about 80% of the energy in one direction (the reflecting side) and for transmission of more than 95% of the energy from the opposite side (the transmitting side). A device with an aspect ratio of 15:1 will be approximately 96.8% transmissive, assuming a perfectly reflecting material for the structures. The spacing between the structures is about one-fourth the dimension of the shaped structures. In this example, the sum of potentially useful reflected energy from one side R plus the sum of potentially useful transmitted energy from the opposite side T is approximately 1.77 (R+T=1.77).

Figure 6:
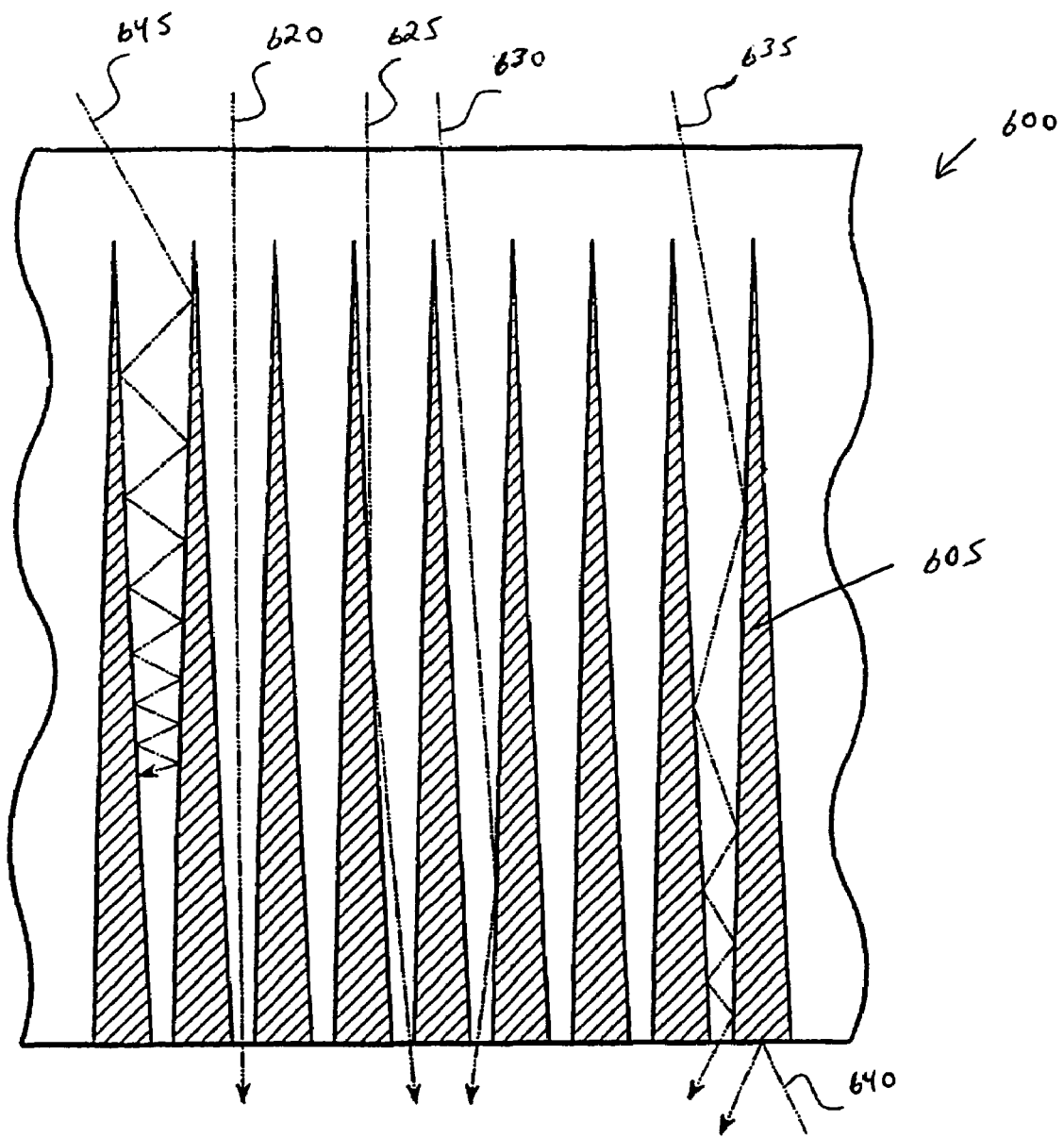
FIG. 6 illustrates a cross-sectional view of another embodiment of a device 600 having reflective and transmissive properties.

Illustrated in FIG. 6 is a cross-sectional view of another embodiment of a device 600 having reflective and transmissive properties. In this embodiment, the device 600 includes reflective structures 605 having an aspect ratio of about 14.3, a spacing between the structures 605 of about 25% of the base width, and the structures 605 evenly spaced across the body of the device 600. This device can produce a transmissivity of about 94% of light rays entering the device 600 perpendicular to the plane from the side closest to the apex (i.e., tip) 610 of the structures 640 (i.e., transmissive side). Additionally, the device 600 can provide the additional benefit of reflecting about 76% of light striking the device 600 from the opposite direction (reflective side). In this example, about 20% of light entering from the transmissive side can pass through the device 600 without redirection, about 40% will pass through the device 600 with a single redirection (4 degrees relative to perpendicular to the plane of the element) and about 40% of the light will have two redirections (8 degrees relative to perpendicular to the plane of the element). Accordingly, this embodiment can provide an R+T of up to 1.70.

In operation, light ray 620 can enter the device 600 perpendicular to the plane of the device 600, passes through the device 600 without striking a structure 605, and can exit the device 600 without redirection. Light ray 625 can enter the device 600 perpendicular to the plane of the device 600, strikes the midpoint of a structure 605, and is minimally redirected (4 degrees relative to perpendicular to the plane of the device 600) such that it exits the device 600 without striking an adjacent structure 605. Light ray 630 can enter the device 600 perpendicular to the plane of the device 600, strike a structure 605 near the apex (tip), and is minimally redirected (4 degrees relative to perpendicular to the plane of the device 600) such that it can strike an adjacent structure 605 near the base of the structure 605, and is again minimally redirected (as above) such that the total redirection of the light ray 630 is 8 degrees from the perpendicular to the plane of the device 600 upon exiting the device 600. Light ray 635 can enter the device 600 at an angle greater than 10 degrees of perpendicular to the plane of the device 600 and strikes a structure 605 above the midpoint and is minimally redirected (4 degrees relative to perpendicular to the plane of the device 600). Due to the increased angle of entry of light ray 635, multiple redirections occur before the light ray 635 exits the device 600. In this example, seven redirections are necessary for light ray the 635 to exit the element—the cumulative redirection is about 28 degrees. Light ray 640 is reflected by a structure 605 at an angle equal to the angle of incidence. Light ray 645 can enter the device 600 at a steep angle relative to the perpendicular to the plane and strikes a structure 605 near the apex (tip). Due to the cumulative redirection, light ray 645 cannot exit the opposite side of the device 600.

One application for a device having reflective and transmissive properties is used in a non-emissive display system, such as a liquid crystal display (LCD), or other device in which light is directed for the purpose of creating an image. Illustrated in FIG. 7 is a cross-sectional view of one embodiment of an LCD 700 utilizing a device 705 having reflective and transmissive properties. As shown in FIG. 7, an LCD stack includes a backlight assembly 710 and a liquid crystal module (LCM), which includes a rear polarizer 715, a liquid crystal suspension 720, and front polarizer 725. In one embodiment, the LCM may include a rear glass plate 730 provided in between the rear polarizer 715 and the liquid crystal suspension 720, and a front glass plate 735 provided in between the front polarizer 725 and the liquid crystal suspension 720. The glass plates 730, 735 can include color filters, common electrodes, TFT matrix, or other components.

In one embodiment, the device 705 can be positioned in between the backlight 710 and the rear polarizer 715 such that its reflective surface faces the LCM and its transmitting surface faces the backlight assembly 710. The device 705 may be a component of the backlight 710, or may be attached to a component of the remainder of the LCM or LCD.

In operation, ambient light ray 740 can pass through the various layers of polarizers 715, 725, glass plates 730, 735 (if present), and the liquid crystal suspension 720 and can be redirected by the reflective structures in the device 705 back through the various layers of the LCM. At the same time, artificial light ray 745 generated from the backlight assembly 710 can pass through the transparent substrate of the device 705 without striking a reflective structure, and exit the device 700 without redirection. Also, artificial light ray 750 can enter the device 705 perpendicular to the plane of the device 705, strike a structure near the apex (tip) and is minimally redirected such that it strikes an adjacent structure near the base of the structure, and is again minimally redirected as the light ray 750 exits the device 705.

In one embodiment, the device 705 can be used in an LCD stack or any other type of display. For example, the device 705 can be positioned within the liquid crystal module itself in three configurations: (1) at the back (surface) of the rear glass of the liquid crystal module and in front of the polarizer, (2) at the back (surface) of the rear glass of the liquid crystal module and behind the polarizer, or (3) inside the rear glass of the liquid crystal module at the pixel level. For a two-polarizer liquid crystal display system, only the second configuration is possible in order for the display to process the light. For a single polarizer liquid crystal display system, all three configurations are possible as the display can process the light.

In one embodiment, the device 705 can be in the form of a foil or a component provided within or adhered to the existing LCD stack. As used herein, "within or adhered to" can include: (1) at the back (surface) of the rear glass of the liquid crystal module and in front of the polarizer, (2) at the back (surface) of the rear glass of the liquid crystal module and behind the polarizer, or (3) inside the rear glass of the liquid crystal module at the pixel level. One example of an LCD manufacturing process can include a roll-to-roll and/or assembled-by-layer process for any of the embodiments described above and the device can be an integral part of the stack. The layers of the LCD stack can be produced and/or assembled on a roll-to-roll basis, and the device can be inherent as a part of the glass, pixel, collimator, or polarizer. The device construction can also be based on layering functional components onto a liquid crystal module substrate, allowing the device to be constructed as part of the overall liquid crystal module manufacturing process. Elements such as ¼ wave plate, linear polarizers, collimating film, brightness enhancement film, polarizer film and light recycling elements may also be integrated into the liquid crystal displays or other displays such as, but not limited to, a color super twisted nematic. Such elements may be glued or epoxied to the layered components.

As described above, the reflective material may be provided on the transparent substrate above the reflective structure, part of the fill for grooves in the transparent substrate, or provided on the base of the reflective structure. In another embodiment, the device may include two separate components: 1) a waveguide layer (which includes the reflective structures) and 2) a reflecting layer having reflective areas with apertures there between, which is separate from the waveguide layer. The reflective areas of the reflecting layer can be associated with (e.g., aligned with), but separated from, the base of the reflective structures in the waveguide layer. The reflective layer can be separated from the waveguide layer by a thin layer (up to several microns thick) of glass or polymer which can act as a barrier to contamination from the layers considered exterior to the core liquid crystal material. Such a reflective layer can be used in transflective displays.

In one embodiment, the reflective layer may be separated from the waveguide layer wherein the space between the reflecting layer and the waveguide layer is defined as a void. There can be greater efficiency in the reflecting layer by locating it on the interior side of a LCD rear glass (or polymer) so that the reflecting area is only microns from the color filters. In this manner, the wave-guide layer can be located adjacent to, or attached to, the backlight. For example, when the reflective structures in the wave-guide layer are triangular in cross-section, the side of the wave-guide layer having the apex of the triangles can face the backlight, while the apertures of the wave-guide can be aligned with the apertures of the reflecting layer. This may provide the highest degree of transmission through the reflecting layer. In one embodiment, air, glass or polymer may be provided to fill the void between the reflecting layer and the wave-guide layer. In another embodiment, collimating film or other type of light enhancement or modification film may be provided above and/or below the wave-guide layer to direct the device-generated light (e.g., backlight) in a maximally efficient manner to the apertures of the reflecting layer.

Illustrated in FIG. 8A is cross-sectional view of one embodiment of an LCD display stack 800 including a reflective layer 805 that is separated from a waveguide layer 810. In this embodiment, the reflecting layer 805 can include reflecting portions 820 separated by apertures 825 and the waveguide layer 810 can include spaced apart reflective structures 830 (e.g., indentations filled with air or other material, structures made from different materials having different indexes of refraction, etc.) provided in a transparent substrate 835 defining apertures 840 between each reflective structure 830.

When used in an LCD display, there can be greater efficiency in the reflecting layer 805 by locating it on the interior side of a LCD rear glass (or polymer) so that the reflecting portions 820 are only microns from the pixels. In this embodiment, the reflective layer 805 can be provided at the pixel level. For example, a portion of the bottom surface of each pixel can be reflective. The portion of the pixel not part of the reflective layer allows for the transmissive portion of the liquid crystal display and is aligned with the apertures of the reflective structures 830 in the wave-guide layer 810. The wave-guide layer 810 can be located adjacent or attached to the backlight assembly in an LCD display system.

In one embodiment, the reflective structures 830 in the wave-guide layer 810 can be triangular in cross-section as shown in FIG. 8. In this embodiment, the side of the wave-guide layer 810 having the apex of the triangular-shaped reflective structures 830 would face the backlight assembly of an LCD system, while the side of the wave-guide layer 810 having the bases of the triangular-shaped reflective structures 830 would face the reflective layer 805.

In one embodiment, the apertures 840 between the reflective structures 830 in the wave-guide layer 810 can be aligned with the apertures 825 between the reflective portions 820 of the reflecting layer 805. This can allow for the highest degree of transmission through the reflecting layer 805. For example, the reflective layer can lie at or below pixel layer, but only over the non-transmitting regions of the wave-guide structure. Certain enabling structures for the pixels can take advantage of the physically distinct areas by placing these structures over, on, or as part of the reflecting structure, such as, but not limited to, the interconnections and the thin film transistors (TFTs). The light valve portion of the pixel can be placed away from the reflecting structure, completely over, or in line with the transmitting region.

In another embodiment, a TFT layer may be positioned onto the barrier layer and the reflective layer can be positioned on top of the TFTs, so that the TFTs are between the reflective layer and the barrier layer. The advantage here is that the reflectivity is not reduced by the shadow of the TFT. The reflective layer can be appropriately patterned and connected to the TFTs using a via hole. If the reflective layer is a source of contamination for the core LC material, another barrier layer might be necessary above this reflecting layer.

In another embodiment, the entire structure with its composite layers, including the barrier layer and wave-guide layer, may function as the back-plane (or back-glass if composed of a glass or glassy-like material).

In one embodiment, a glass (or polymer) and a polarizer may be provided between the reflecting layer 805 and the wave-guide layer 810. In another embodiment, collimating film may be provided between the reflective layer 805 and the wave-guide layer 810, alone or in combination with other components, to direct the device-generated light (e.g., backlight assembly) in a maximally efficient manner to the apertures 825 of the reflecting layer 805. The collimating film may be provided as an entire layer between the reflective layer 805 and the wave-guide layer 810 or may be provided in portions that are generally aligned with the apertures 840 between the reflective structures 830 in the wave-guide layer 810.

Figure 8B:
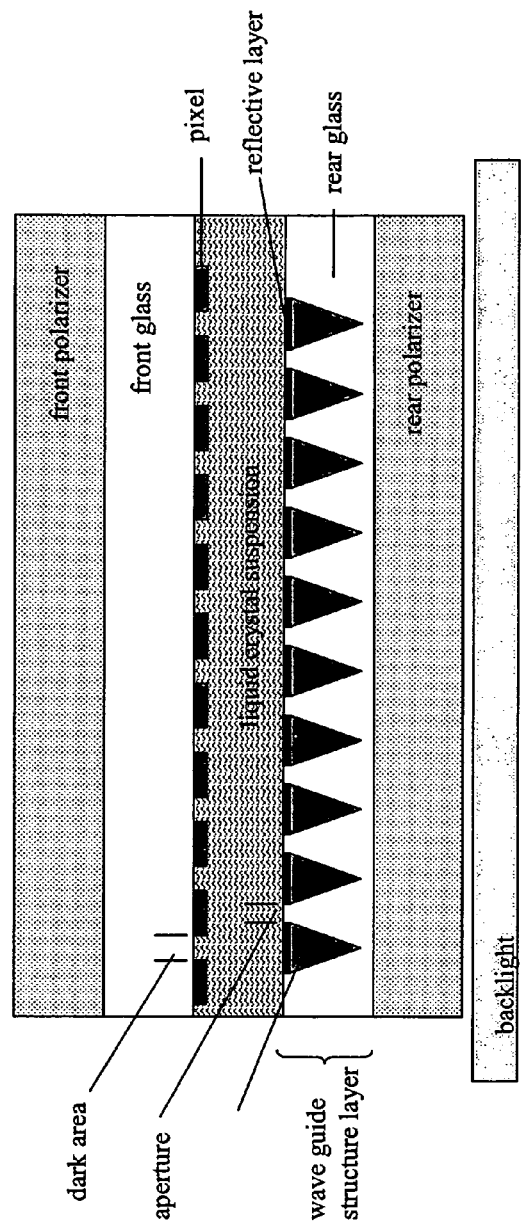
FIG. 8B illustrates another embodiment of a LCD utilizing a device having separate reflective and waveguide structure layers.

Illustrated in FIG. 8B is another embodiment of a LCD utilizing a device having separate reflective and waveguide structure layers. In this embodiment, the wave-guide structures may be etched in the rear glass (or polymer) plate such that voids or indentations are created in the glass. The voids or indentations can be filled with a material having a different index of refraction than that of the glass (or polymer) plate such as air, polymer, or a reflective metal or composite material. The voids or indentations are positioned in the glass (or polymer) having such that the apex of the triangular wave-guide structure faces the backlight. Accordingly, the rear glass (or polymer) plate can serve as the wave-guide structure layer where the glass (or polymer) is the transparent substrate to permit light to pass through. In this embodiment, the reflective layer can be provided at the pixel level. For example, a portion of or the bottom or top surface of each pixel can be reflective. The portion of the pixel not part of the reflective layer allows for the transmissive portion of the liquid crystal display and is aligned with the apertures of the wave-guide structure.

Figure 8C:
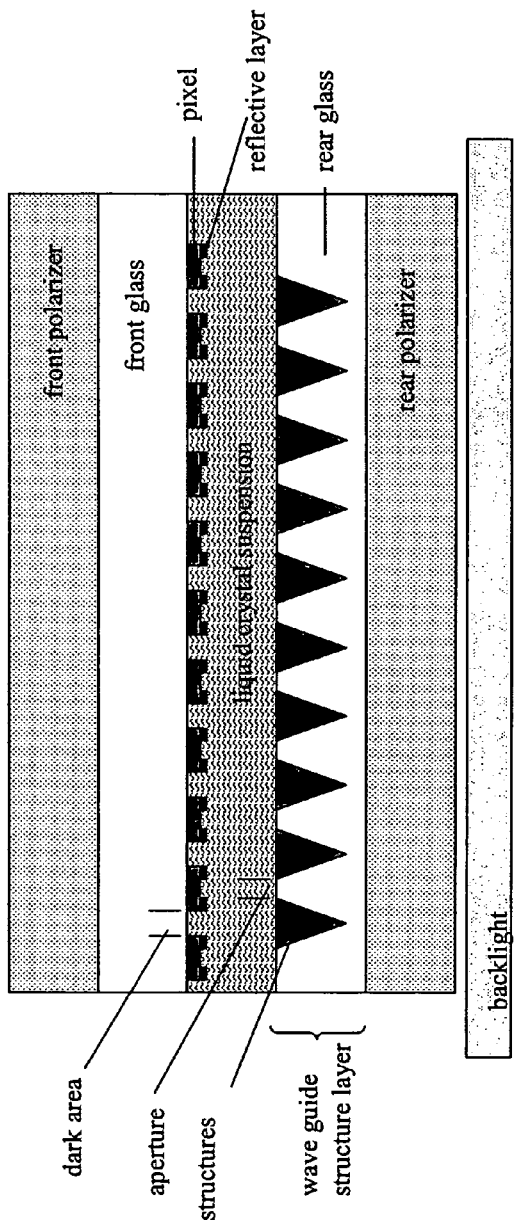
FIG. 8C illustrates another embodiment of a LCD utilizing a device having reflective and transmissive properties.

Illustrated in FIG. 8C is another embodiment of a LCD utilizing a device having reflective and transmissive properties. In this embodiment, the wave-guide structures may be etched in the rear glass (or polymer) plate such that voids or indentations are created in the glass. The voids or indentations can be filled with a material having a different index of refraction than that of the glass (or polymer) plate such as air, polymer, or a reflective metal or composite material. The voids or indentations are positioned in the glass (or polymer) having such that the apex of the triangular wave-guide structure faces the backlight. Accordingly, the rear glass (or polymer) plate can serve as the wave-guide structure layer where the glass (or polymer) is the transparent substrate to permit light to pass through. In this embodiment, the reflective layer can be provided on top of the base of the triangular reflective structures.

Figure 8D:
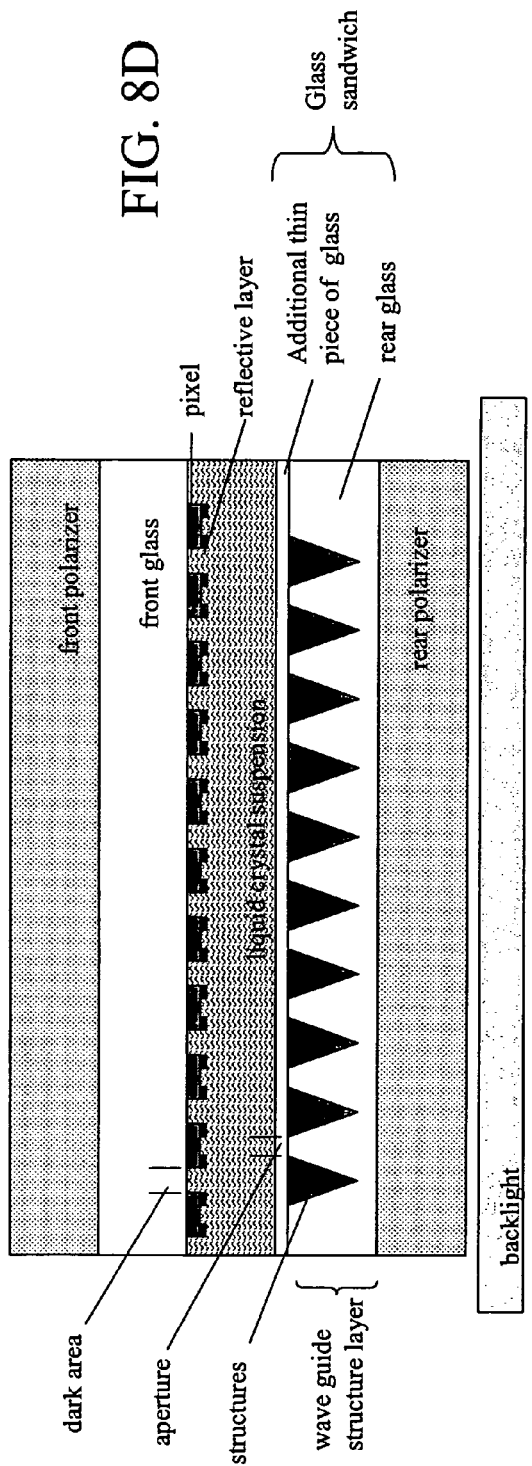
FIG. 8D illustrates another embodiment of a LCD utilizing a device having separate and reflective and waveguide structure layers.

Illustrated in FIG. 8D is another embodiment of a LCD utilizing a device having separate and reflective and waveguide structure layers. In this embodiment, the wave-guide structures may be etched in the rear glass (or polymer) plate such that voids or indentations are created in the glass. The voids or indentations can be filled with a material having a different index of refraction than that of the glass (or polymer) plate such as air, polymer, or a reflective metal or composite material. The voids or indentations are positioned in the glass (or polymer) having such that the apex of the triangular wave-guide structure faces the backlight. Accordingly, the rear glass (or polymer) plate can serve as the wave-guide structure layer where the glass (or polymer) is the transparent substrate to permit light to pass through. To ensure proper flatness of the surface of the rear glass (or polymer) plate facing the liquid crystal suspension, a thin piece of glass (or polymer) may be provided between the rear glass plate and the liquid crystal suspension. In this embodiment, the reflective layer can be provided at the pixel level. For example, a portion of the bottom surface of each pixel can be reflective. The portion of the pixel not part of the reflective layer allows for the transmissive portion of the liquid crystal display and is aligned with the apertures of the wave-guide structure.

In another related embodiment, the wave guide structures can be laid on top of or deposited on the bottom side of the additional thin piece of glass. For example, an isosceles shaped wave-guide structure made of metal or a highly reflective material resting on glass. The structures may be attached to the glass plate using an optical epoxide. In this embodiment, the reflective layer can be provided at the pixel level. For example, a portion of the bottom surface of each pixel can be reflective. The portion of the pixel not part of the reflective layer allows for the transmissive portion of the liquid crystal display and is aligned with the apertures of the wave-guide structure. In another embodiment, the reflective layer can be provided on top of the base of the triangular reflective structures.

Figure 8E:
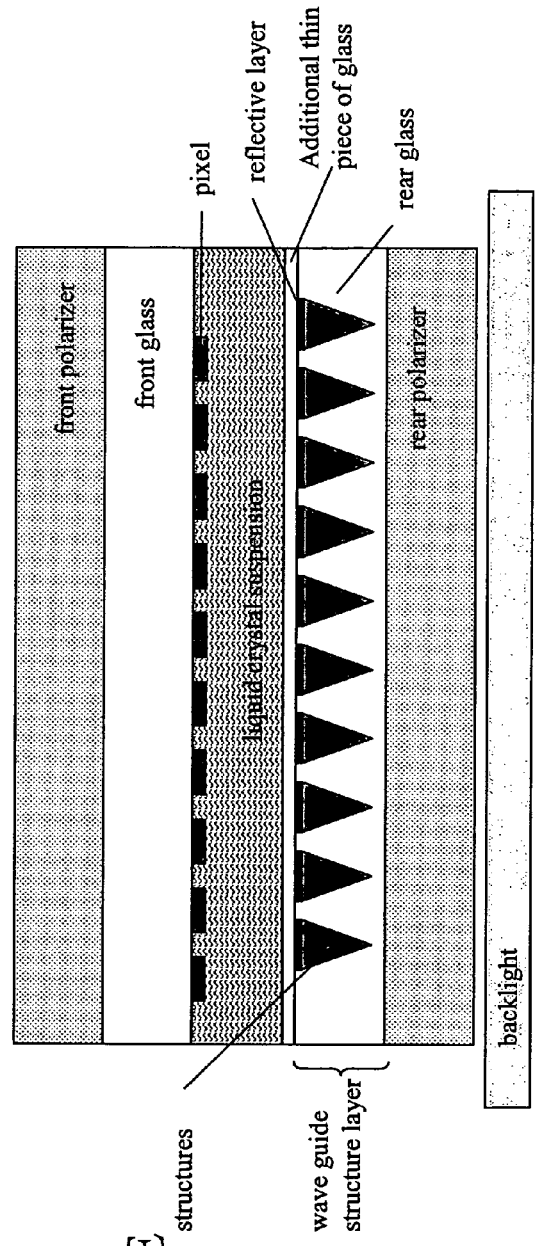
FIG. 8E illustrates another embodiment of a LCD utilizing a device having reflective and transmissive properties.

Illustrated in FIG. 8E is another embodiment of a LCD utilizing a device having reflective and transmissive properties. In this embodiment, the wave-guide structures may be etched in the rear glass (or polymer) plate such that voids or indentations are created in the glass. The voids or indentations can be filled with a material having a different index of refraction than that of the glass (or polymer) plate such as air, polymer, or a reflective metal or composite material. The voids or indentations are positioned in the glass (or polymer) having such that the apex of the triangular wave-guide structure faces the backlight. Accordingly, the rear glass (or polymer) plate can serve as the wave-guide structure layer where the glass (or polymer) is the transparent substrate to permit light to pass through. To ensure proper flatness of the surface of the rear glass (or polymer) plate facing the liquid crystal suspension, a thin piece of glass (or polymer) may be provided between the rear glass plate and the liquid crystal suspension. In this embodiment, the reflective layer can be provided on top of the base of the triangular reflective structures. In one embodiment, the additional piece of glass (or polymer) can sufficiently thin (50 microns, for example) to reduce or eliminate parallax arising from the separation between the pixels and the reflective layer. For color LCD applications color shift can be reduced or eliminated as well.

One example of a method to manufacture the embodiments discussed above in FIGS. 8C and 8D includes the following steps: 1) providing a front piece of glass (with metal strips provided thereon for embodiment illustrated in FIG. 8D) sufficiently thin to reduce or eliminate parallax arising from the separation between the pixels and the reflective layer; 2) deposit an inorganic/organic polymer mixture on one surface of the rear glass plate; 3) form wave guide structures (such as channels) in the polymer mixture; 4) wash away the organics and cure until the polymer becomes hard; and 5) mate the two pieces of glass together to form a glass sandwich while aligning the metal and polymer to create the device on the interior of the glass sandwich.

Another example of a method to manufacture the embodiments discussed above in FIGS. 8C and 8D includes the following steps: 1) make the front piece of glass sufficiently thin to reduce or eliminate parallax arising from the separation between the pixels and the reflective layer; 2) make the rear glass plate using polymer or glass in which the lenticular channels (structures) have been formed; and 3) with an optical adhesive (such as an epoxide), bring the reflective side of the front piece of glass together with lenticular channel side of the rear piece of glass.

Figure 8F:
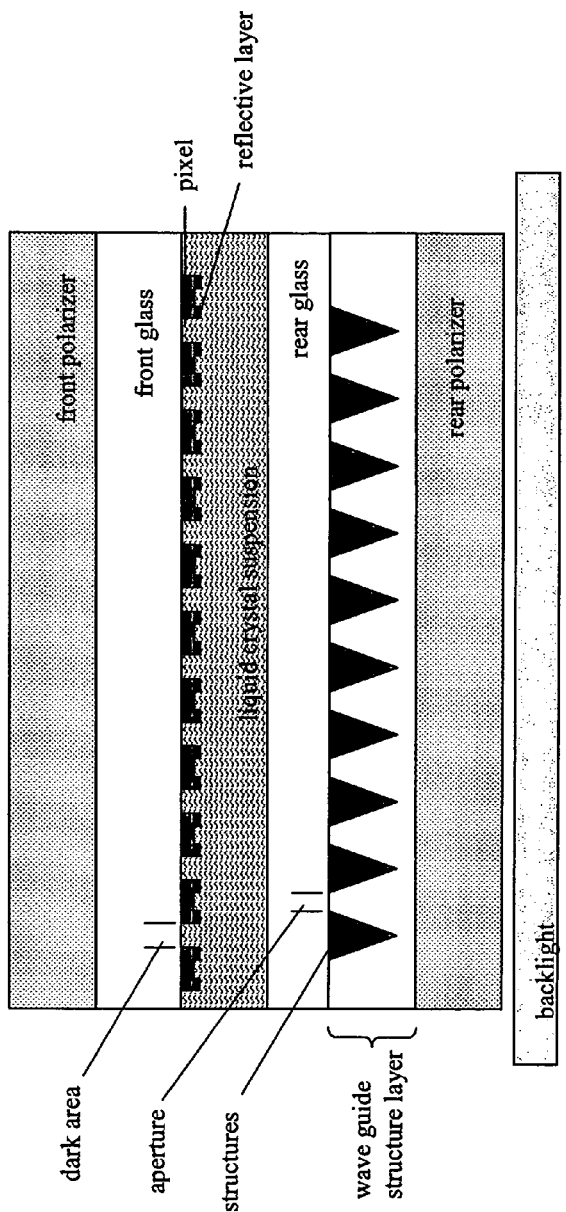
FIG. 8F illustrates another embodiment of a LCD utilizing a device having separate and reflective waveguide structure layers.

Illustrated in FIG. 8F is another embodiment of a LCD utilizing a device having separate and reflective waveguide structure layers. In this embodiment, the wave-guide structures may be provided as a separate component in between the rear glass (or polymer) plate and the rear polarizer. In this embodiment, the reflective layer can be provided at the pixel level. For example, a portion of the bottom surface of each pixel can be reflective. The portion of the pixel not part of the reflective layer allows for the transmissive portion of the liquid crystal display and is aligned with the apertures of the wave-guide structure.

Figure 8G:
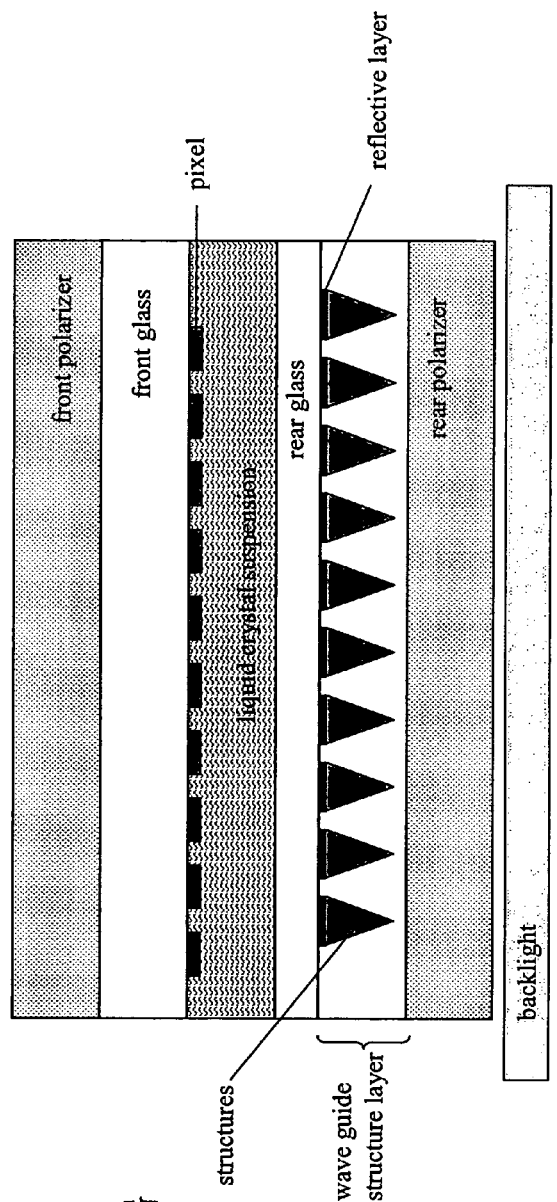
FIG. 8G illustrates another embodiment of a LCD utilizing a device having reflective and transmissive properties.

Illustrated in FIG. 8G is another embodiment of a LCD utilizing a device having reflective and transmissive properties. In this embodiment, the device having an integrated wave-guide structures and reflective layer can be provided as a separate component in between the rear glass (or polymer) plate and the rear polarizer.

In another embodiment, the device can be used in a display having a side-mounted backlight, a CCFL for example. In this embodiment, the rear piece of the glass sandwich can be made into the wave-guide for the side-mounted backlight. The rear piece of the sandwich can also be made of polymer (polycarbonate, for example). To accomplish this, lens lets can be provided to focus the light onto the transmitting wave-guide device during the process of making the backlight waveguide.

The device can be placed in conjunction with other elements to produce additional effects. In the preferred embodiment, a collimating element may be integrated with the device to form a single element, may be attached to the device, or may be incorporated into another component of a system to which the device is attached, such that the collimating element is proximal to the transmitting side of the device and between the element and the transmissive light source. The collimating element can accept incoming energy waves distributed over a broad angle and redirects the energy waves to emerge at an angle less than some specified angle as measured from the normal to the surface of the device. The use of a collimating element ensures that virtually all energy entering the device from the transmissive surface will be constrained within an arc of about 10° of perpendicular to the plane of the element. Constraining transmitted energy in this manner will improve the performance of the device, but is not a requirement for the device to produce beneficial effects. It will be appreciated that the collimating element may be any light transmissive material with an index of reflection lower than that of the transmissive material of the device.

In one embodiment, a non-emissive display system can include a means for collimating light such that the majority of light emerges perpendicular to the device. Also, the non-emissive display system can include a means for polarizing light. In any case, the collimating and/or polarizing material may be attached to the reflective and/or transmissive side of the device. The collimating and/or polarizing material can be attached to the entire reflective surface of the device or to just the apertures between the wave guide structures of the device. The collimating and/or polarizing materials may be an integrated design element and part of the manufactured product, not just adhered or fixed to either surface of the device. If collimating film is required to optimize performance for the liquid crystal module after emergence from the device (on its reflective side), the collimating film may either cover the entire area of the device or simply cover the apertures from which the light emerges. The collimating film may cover the full area of the display or at least a portion thereof. The indentations or objects may be arranged at any angle to the edge of the display, from parallel to oblique. Alternatively, a polymer having a higher index of refraction than the transparent material or substrate could be used to optimize the performance. By just covering the apertures, the impact on the reflective portions of the device can be minimized.

Figure 9A:
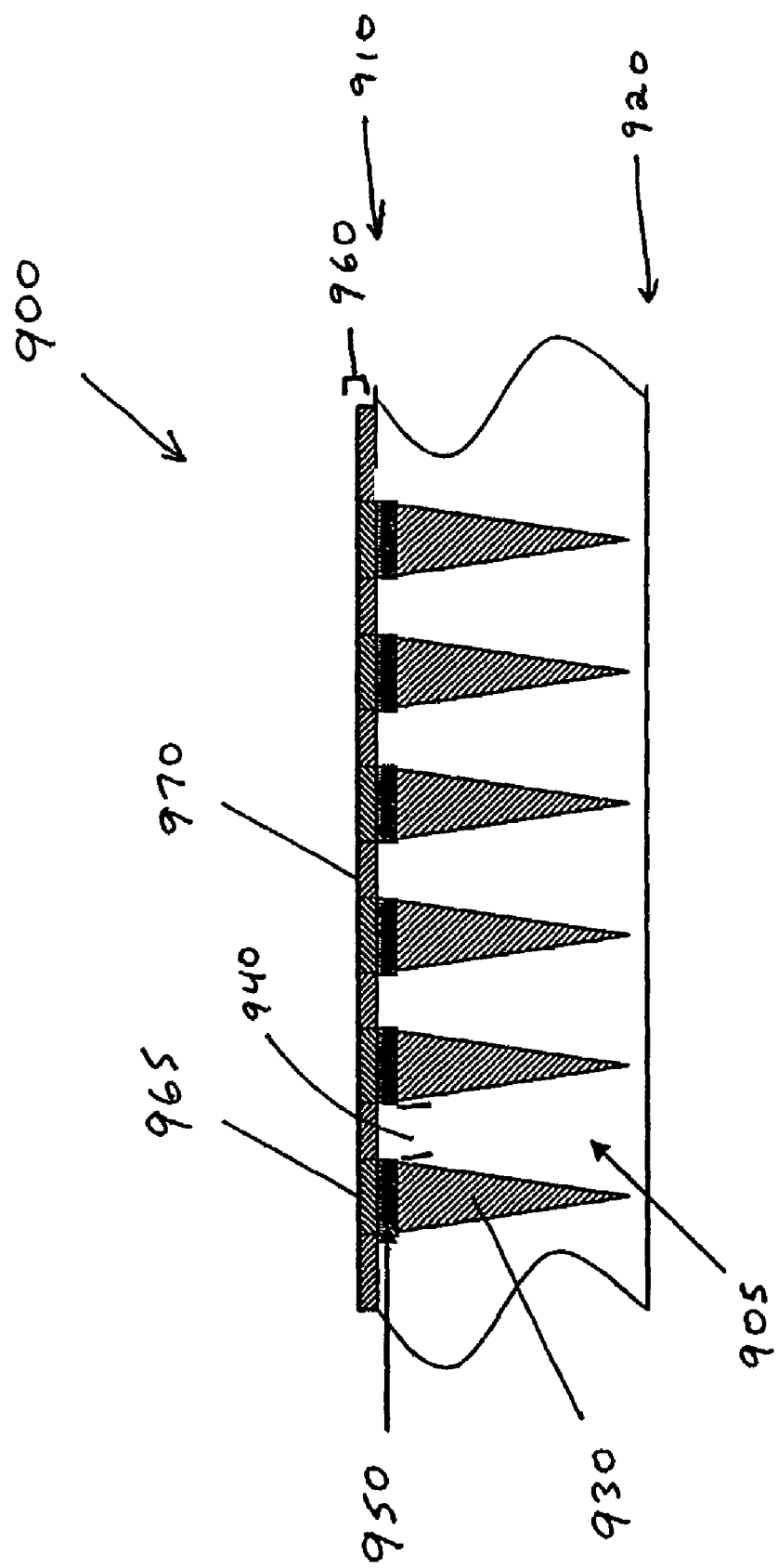
FIG. 9A illustrates one embodiment of a device 900, similar to the device 300 shown in FIG. 3, but having a linear polarizing layer 960 disposed thereon.

Illustrated in FIG. 9A is one embodiment of a device 900 similar to the device 300 in structure and function shown in FIG. 3 and described above, but having a linear polarizing layer 960 disposed thereon. In one embodiment, the device 900 can include a transparent substrate 905 having a first surface 910 and an opposing, second surface 920. The device 900 can also include a plurality of spaced-apart reflective structures 930 positioned within the transparent substrate 905 defining apertures 940 therebetween. In this embodiment, the device 900 can include a light modification layer.

In one embodiment, the light modification layer can include a reflecting linear polarizing layer 960 on the first surface 910 of the transparent substrate 905. The linear polarizing layer 960 can polarize the reflected light and the transmitted light orthogonal to each other and in phase with each other. In one embodiment, the linear polarizing layer 960 may have two distinct regions, a reflective linear polarizing region 965 substantially aligned with the reflective material 950, and a transmissive linear polarizing region 970 substantially aligned with the apertures 940 between the reflective structures 930. The reflective linear polarizing region 965 can reflect an orthogonal component of light incident upon it, thereby increasing the brightness of a display without changing the viewing angle of the display. In one embodiment, the reflective linear polarizing regions 965 and the transmissive linear polarizing regions 970 can have different optic axes. For example, the optic axes can be orthogonal to each other so that the reflective and transmissive light produced in these regions is cooperative instead of competitive.

Figure 9B:
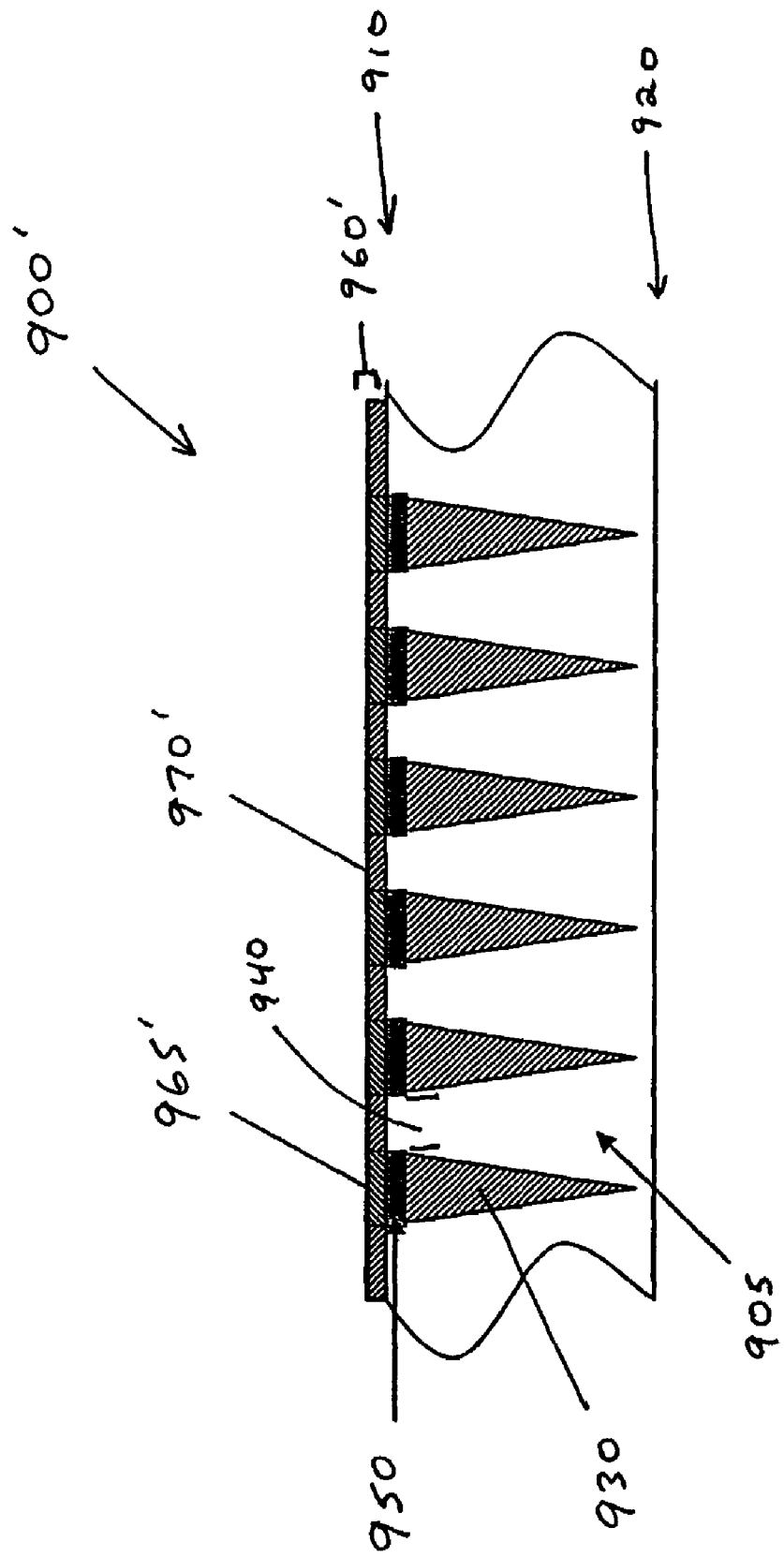
FIG. 9B illustrates one embodiment of a device 900', similar to the device 300 shown in FIG. 3, but having an absorbing polarizing layer 960'.

FIG. 9B illustrates another embodiment of a device 900' similar to the device 900 shown in FIG. 9A and described above. In this embodiment, an absorbing polarizing layer 960' is provided instead of the linear polarizing layer 960 as described above with reference to the device 900. In one embodiment, the absorbing polarizing layer can include two regions: a reflective absorbing polarizing region 965' and a transmissive absorbing polarizing region 970'. For example, the reflective absorbing polarizing region 965' can be substantially aligned with the reflective material 950, while the transmissive absorbing polarizing region 970' can be substantially aligned with the apertures 940 between the reflective structures 930. The optic axes of the two regions would also be similarly orthogonal to each other as described above regarding the device 900, but the transmissive absorbing polarizing region 970' can transmit light from the transparent substrate 905 through the transmissive absorbing polarizing region 970' and cooperatively combine it with the light from the reflective absorbing polarizing region 965'. The absorbing polarizing layer 960' can absorb light exiting the transparent substrate 905 that is not orthogonal to and in phase with light being reflected by the reflecting material 950.

Figure 9C:
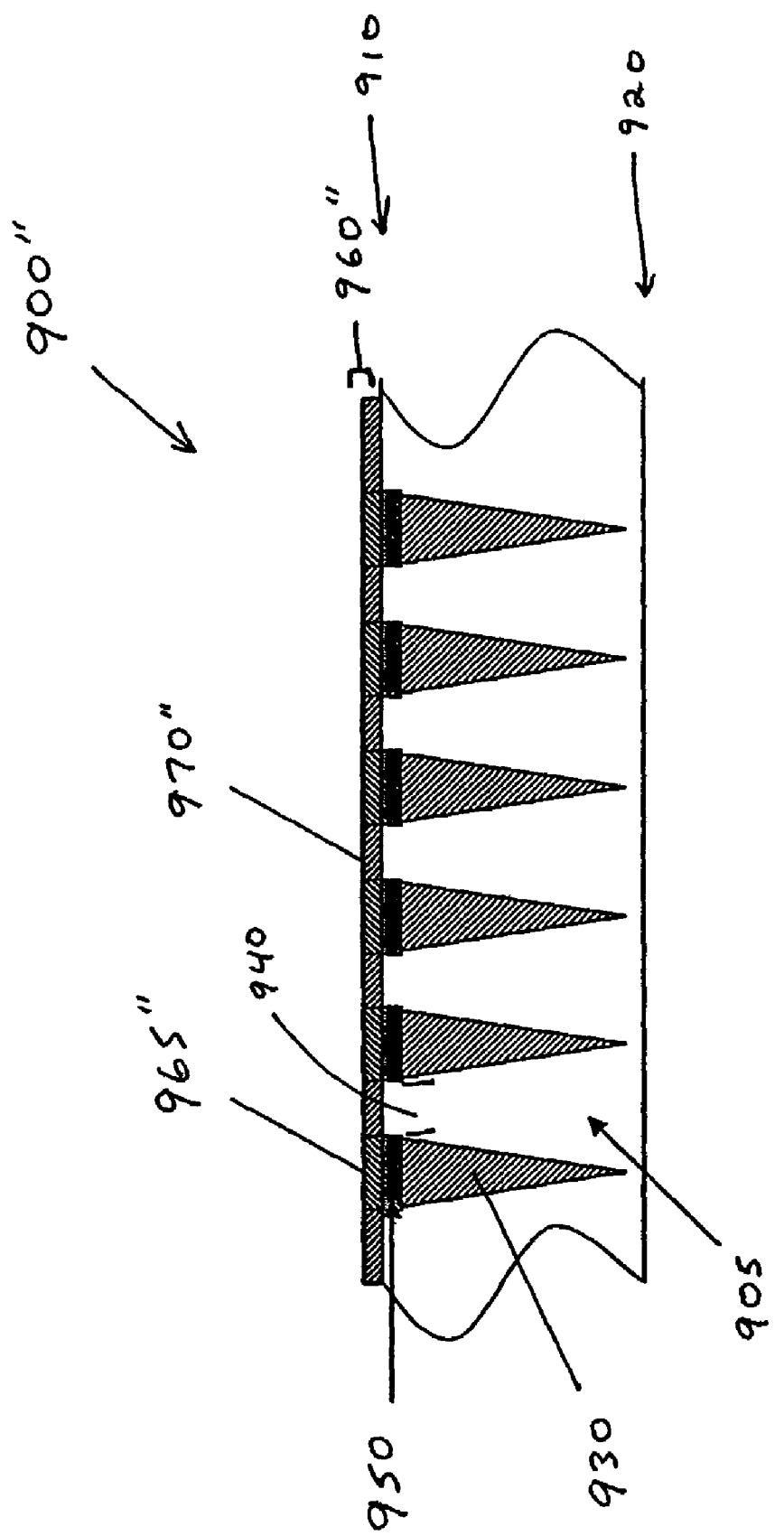
FIG. 9C illustrates one embodiment of a device 900″, similar to the device 300 shown in FIG. 3, but having a diffusing layer 960″.

FIG. 9C illustrates yet another embodiment of a device 900" similar to the device 900 shown in FIG. 9A and described above. In this embodiment, a diffusing layer 960" is provided instead of the linear polarizing layer 960' discussed above with reference to the device 900. The diffusing layer 960" can moderate the intensity of light by scattering some of the light rays that are incident upon it. In one embodiment, the diffusing layer 960" can include two regions: a reflective diffusing region 965" and a transmissive diffusing region 970". For example, the reflective diffusing region 965" can be substantially aligned with the reflecting material 950 to diffuse the ambient light reflected from the reflecting material 950. The transmissive diffusing region 970" can be substantially aligned with apertures 940 to diffuse the light emanating from the backlight source through the transparent material 905. In one embodiment, the transfer function (i.e., specifications and characteristics) of the reflective diffusing 965" region can be optimized by matching it with the transfer function of the reflecting material 950 and the ambient light source. In another embodiment, the transfer function (i.e., specifications and characteristics) of the transmissive diffusing region 970" can be optimized by matching it with the transfer function of the transparent region 905 and the backlight.

In another embodiment, two different types of collimating films can be provided over the reflecting material and the transparent material to optimize the different light distributions associated with each component (e.g., the reflecting material and the transparent material). For example, the collimating films can be matched to the different light sources (e.g., the ambient light and the backlight). In another embodiment, collimating film can be provided over only one of the reflective or transmissive regions, while the other region remains unchanged.

While the present application has been illustrated with descriptions of several embodiments, and while these embodiments have been described in considerable detail, it is not the intention of the applicants to restrict or in any way limit the scope of the appended claims to such detail. Additional advantages and modifications will readily appear to those skilled in the art. Therefore, the present application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A liquid crystal module comprising:
    a liquid crystal layer containing a plurality of pixels therein;
    a waveguide layer including;
    a transparent material having first and second surfaces, the transparent material having a first index of refraction; and
    a plurality of spaced-apart waveguide structures defining apertures therebetween, the waveguide structures being disposed within the transparent film and having a second index of refraction different than the first index of refraction of the transparent material, the waveguide structures being configured to guide light, entering the first surface of the transparent material, through the film and permit such light to exit the second surface of the transparent material; and
    a reflective layer provided between the liquid crystal layer and the waveguide layer, the reflective layer includes a plurality of reflective areas and a plurality of apertures to permit light to pass therethrough;
    wherein the liquid crystal layer, the reflective layer, and the waveguide layer are all aligned with each other such that:
    each pixel in the liquid crystal layer is substantially aligned with two reflective areas separated by one of the apertures in the reflective layer, and
    the apertures between each waveguide structure are substantially aligned with the apertures in the reflective layer.

2. The liquid crystal module of claim 1, wherein each waveguide structure has a base associated with the second surface of the transparent material, and each reflective area is substantially aligned with the base of one of the waveguide structures.

3. The liquid crystal module of claim 1, wherein the waveguide structures are defined by voids in the transparent material.

4. The liquid crystal module of claim 3, wherein the voids are filled with air, metal, or polymer.

5. The liquid crystal module of claim 1, wherein the plurality of waveguide structures each include a triangular shaped cross-section having a base adjacent the second surface of the transparent material, and a pair of sidewalls that converge to an apex.

6. The liquid crystal module of claim 5, wherein the angle of each sidewall relative to the base of the triangular shaped waveguide structure is between about 76 degrees and less than 90 degrees.

7. The liquid crystal module of claim 5, wherein each of the plurality of waveguide structures has an aspect ratio of between about 2 and about 22.

8. The liquid crystal module of claim 1, further comprising a backlight assembly provided below the waveguide layer.

9. The liquid crystal module of claim 1, wherein:
    light arriving from a first direction facing the first surface of the transparent material is guided by the waveguide structures and transmitted through the transparent material thereby exiting the second surface of the transparent material; and
    light arriving from a second direction, opposite the first direction, is reflected by the reflecting areas of the reflecting layer back towards the second direction,
    wherein the sum of the percentage of light being reflected back towards the second direction relative to the light arriving from the second direction, and the percentage of light being transmitted relative to the amount of light arriving from the first direction, is greater than 100 percent.

10. A device having transmissive and reflective properties for use in a non-emissive display having a backlight, the device comprising:
    a transparent substrate including first and second surfaces, the transparent substrate having:
    means for reflecting light arriving from a first direction back towards the first direction having a plurality of reflective regions, and
    means for transmitting light arriving from a second direction, opposite the first direction,
    wherein the sum of the percentage of light being reflected back towards the first direction relative to the amount of light arriving from the first direction, and the percentage of light being transmitted through the transparent substrate relative to the amount of light arriving from the second direction, is greater than 100 percent when measured from a reference point facing the first surface, and
    a light modification layer disposed on the first surface of the transparent substrate, said light modification layer having a polarizing layer configured to polarize reflected light and transmitted light orthogonal to each other, said polarizing layer comprising:
    a plurality of reflecting linear polarizing regions, each reflecting linear polarizing region being substantially aligned with each reflective region of the light reflecting means, and
    a plurality of transmissive linear polarizing regions, each transmissive linear polarizing region being substantially aligned with apertures between each reflective region of the light reflecting means.

11. The device of claim 10, wherein the light reflecting means includes a plurality of spaced-apart reflective regions adjacent the first surface of the transparent substrate.

12. The device of claim 11, wherein the light transmitting means includes a plurality of waveguide structures, each waveguide structure being associated with each reflective region, each waveguide structure having an index of refraction different than the index of refraction of the transparent substrate.

13. The device of claim 12, wherein the light transmitting means is configured to guide light entering the second surface of the transparent substrate through the transparent substrate so that such light exits the first surface of the transparent substrate.

14. The device of claim 12, wherein the waveguide structure includes a base and converging sidewalls, the base being associated with each reflective region.

15. The device of claim 10, wherein the reflecting and transmissive linear polarizing regions comprise optic axes that are orthogonal to each other.

* * * * *